United States Patent
Menes et al.

(10) Patent No.: US 9,031,063 B2
(45) Date of Patent: May 12, 2015

(54) DIRECT UPDATING OF NETWORK DELAY IN SYNCHRONIZATION PACKETS

(71) Applicant: Mellanox Technologies Ltd., Yokneam (IL)

(72) Inventors: Miriam Menes, Tel Aviv (IL); Freddy Gabbay, Givataim (IL); Zachy Haramaty, Hemed (IL)

(73) Assignee: Mellanox Technologies Ltd., Yokneam (IL)

( * ) Notice: Subject to any disclaimer, the term of this patent is extended or adjusted under 35 U.S.C. 154(b) by 120 days.

(21) Appl. No.: 13/778,180

(22) Filed: Feb. 27, 2013

(65) Prior Publication Data

US 2014/0241344 A1    Aug. 28, 2014

(51) Int. Cl.
*H04L 7/00* (2006.01)
*H04J 3/06* (2006.01)
*H04L 12/26* (2006.01)

(52) U.S. Cl.
CPC ............ *H04J 3/0673* (2013.01); *H04L 43/0852* (2013.01); *H04J 3/0667* (2013.01)

(58) Field of Classification Search
None
See application file for complete search history.

(56) References Cited

U.S. PATENT DOCUMENTS

| | | | | |
|---|---|---|---|---|
| 6,778,493 | B1* | 8/2004 | Ishii | 370/229 |
| 2004/0141510 | A1* | 7/2004 | Blanc et al. | 370/401 |
| 2009/0135827 | A1* | 5/2009 | Dewan et al. | 370/394 |
| 2010/0302967 | A1* | 12/2010 | Lee et al. | 370/252 |
| 2011/0286449 | A1* | 11/2011 | Ichino | 370/389 |
| 2012/0128011 | A1* | 5/2012 | Holmeide et al. | 370/474 |
| 2013/0003575 | A1* | 1/2013 | Konishi et al. | 370/252 |
| 2013/0128903 | A1* | 5/2013 | Kristoffersen et al. | 370/503 |
| 2014/0010244 | A1* | 1/2014 | Bui et al. | 370/503 |
| 2014/0177653 | A1* | 6/2014 | Tzeng | 370/503 |

OTHER PUBLICATIONS

IEEE Standard 1588, "IEEE Standard for a Precision Clock Synchronization Protocol for Networked Measurement and Control Systems", 289 pages, Jul. 24, 2008.

* cited by examiner

*Primary Examiner* — Hassan Kizou
*Assistant Examiner* — Hashim Bhatti
(74) *Attorney, Agent, or Firm* — D. Kligler I.P. Services Ltd.

(57) ABSTRACT

A method includes receiving in a network element a packet, which includes a delay field that indicates an overall time delay accumulated by the packet until arriving at the network element. Upon receiving the packet, an interim value is substituted in the delay field. The interim value is indicative of a difference between the overall time delay and an arrival time of the packet at the network element. Before sending the packet from the network element, the overall time delay is updated in the delay field based on the interim value and on a departure time at which the packet is to exit the network element. The packet, including the updated overall time delay, is transmitted from the network element.

12 Claims, 2 Drawing Sheets

DIRECT UPDATING OF NETWORK DELAY IN SYNCHRONIZATION PACKETS

FIELD OF THE INVENTION

The present invention relates generally to communication networks, and particularly to methods for network time synchronization.

BACKGROUND OF THE INVENTION

Some communication networks use various clock synchronization mechanisms and clock distribution protocols for synchronizing network nodes to a common time base. An example clock synchronization protocol is specified in the IEEE 1588-2008 standard, entitled "IEEE Standard for a Precision Clock Synchronization Protocol for Networked Measurement and Control Systems," July, 2008, which is incorporated herein by reference.

SUMMARY OF THE INVENTION

An embodiment of the present invention that is described herein provides a method including receiving in a network element a packet, which includes a delay field that indicates an overall time delay accumulated by the packet until arriving at the network element. Upon receiving the packet, an interim value is substituted in the delay field. The interim value is indicative of a difference between the overall time delay and an arrival time of the packet at the network element. Before sending the packet from the network element, the overall time delay is updated in the delay field based on the interim value and on a departure time at which the packet is to exit the network element. The packet, including the updated overall time delay, is transmitted from the network element.

In some embodiments, updating the overall time delay includes adding a departure time at which the packet is to exit the network element to the interim value. In other embodiments, updating the overall time delay is performed without buffering any indication of the arrival time outside the packet.

In some embodiments, the packet includes a synchronization packet used for synchronizing network nodes to a common time base. In other embodiments, the synchronization packet complies with an IEEE 1588-2008 protocol. In yet other embodiments, substitution of the interim value is performed at an ingress port at which the packet enters the network element, and updating of the overall time delay is performed at an egress port at which the packet exits the network element.

There is additionally provided, in accordance with an embodiment of the present invention, a network element including multiple ports, a fabric, and control circuitry. The fabric is configured to forward packets between the ports. The control circuitry is configured to receive over one of the ports a packet including a delay field that indicates an overall time delay accumulated by the packet until arriving at the network element, to substitute in the delay field, upon receiving the packet, an interim value that is indicative of a difference between the overall time delay and an arrival time of the packet at the network element, to update the overall time delay in the delay field, before sending the packet from the network element, based on the interim value and on a departure time at which the packet is to exit the network element, and to transmit the packet, including the updated overall time delay, from the network element over another of the ports.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for network clock synchronization in communication networks. In a typical embodiment, a certain network node is defined as a clock master. The clock master sends synchronization packets over the network, and network nodes receiving the packets use them to synchronize to the time base of the clock master.

Each synchronization packet comprises fields that indicate the time of departure from the clock master, and the overall time delay that the packet accumulated while traversing the network. When a synchronization packet traverses a network switch, the switch updates the overall time delay in the packet to include the delay added by the switch. Thus, when the synchronization packet reaches a certain destination node, the node is able to extract the total delay accumulated by the packet, and to synchronize to the clock master's time base while compensating for this delay.

In the embodiments of the present invention, a network switch is configured to update the delay field of a synchronization packet in a simple and efficient manner. Upon receiving the packet, the switch calculates the difference between the packet time of arrival (in accordance with some internal clock of the switch) and the overall delay indicated in the packet. The switch overwrites the delay field of the packet with this difference, and proceeds to process the packet. Before the packet leaves the switch, the switch calculates the difference between the content of the delay field and the expected time of departure (in accordance with the internal clock of the switch). The latter difference indicates the overall accumulated delay, including the internal delay added by the switch. The switch updates the delay field of the packet with this value before sending the packet onwards.

When using the disclosed technique, all the information relating to delay is stored in the packet itself as it is processed by the switch. Thus, the switch has no need to store delay-related information, such as time stamps that record the times-of-arrival of synchronization packets, in memory. As a result, packet processing in the switch is simplified and memory requirements are reduced.

System Description

Figure 1:
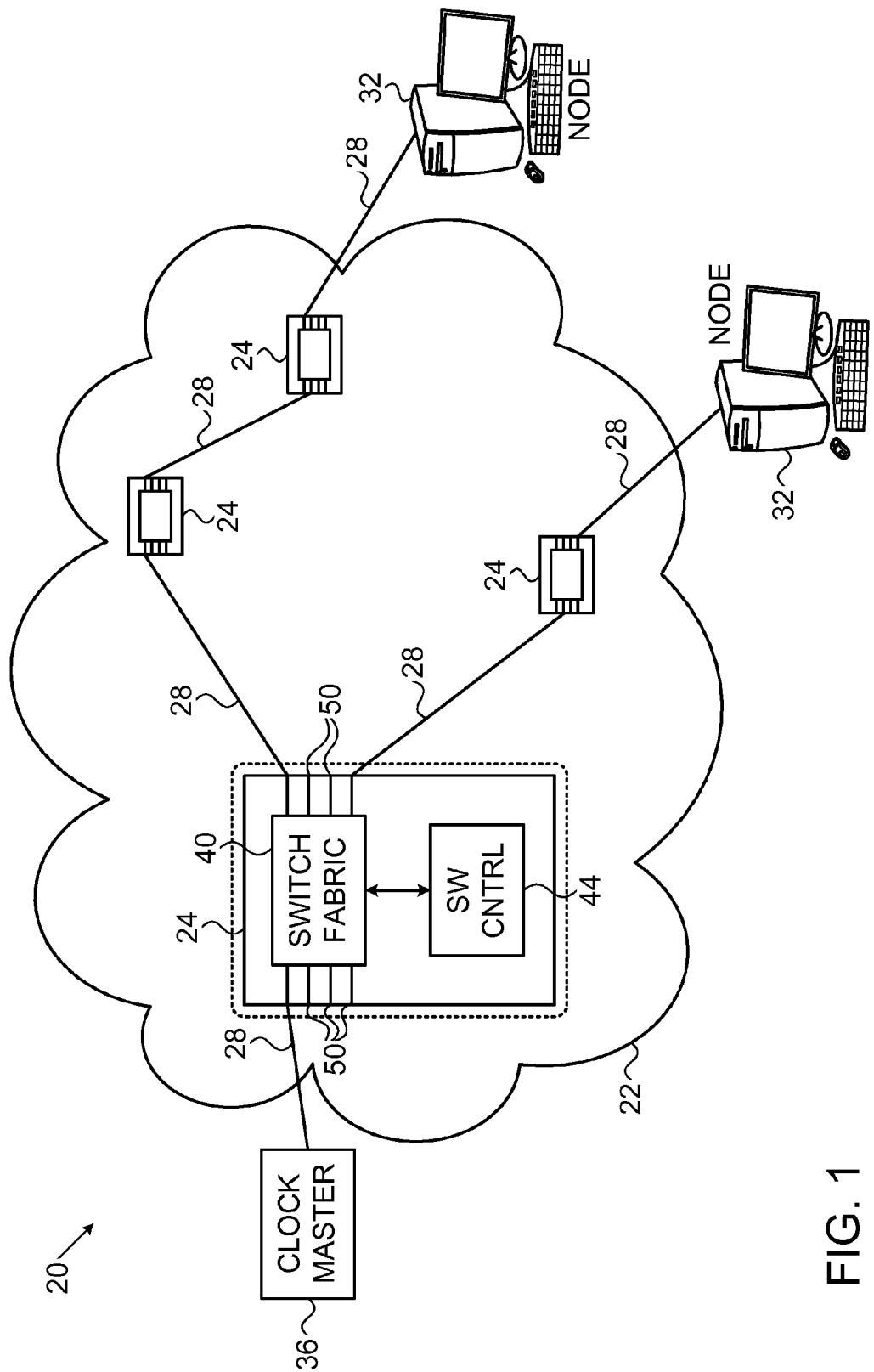
FIG. 1 is a block diagram that schematically illustrates a communication system, in accordance with an embodiment of the present invention.

FIG. 1 is a block diagram that schematically illustrates a communication system 20, in accordance with an embodiment of the present invention. A network 22 comprises one or more network switches 24 connected by one or more network links 28 to one or more compute nodes (shown in FIG. 1 as computer terminals).

A certain node, referred to as a clock master 36, transmits synchronization packets to and the various network nodes. As can be seen in the figure, the path from the clock master to each node traverses one or more network switches and one or more network links.

Each network switch 24 (e.g., the switch whose internal elements are shown in detail in a dotted contour) comprises multiple ports 50, a switch fabric 40 and a switch control unit 44. Each port 50 can serve either as an ingress (input) or as an egress (output) port. Switch fabric 40 forwards each incoming packet from the designated ingress port to the designated respective egress port, in accordance with control commands received from switch control unit 44.

The configurations of system 20 and switch 24 shown in FIG. 1 are exemplary configurations that are chosen purely for the sake of conceptual clarity. In alternative embodiments, any other suitable network and/or switch configuration can be used. Nodes 32 are shown as computer terminals connected to network 22 for conceptual clarity, but may comprise any suitable data device or peripheral. Moreover, system 20 may comprise a variety of network elements and multiple nodes not shown here in FIG. 1, and thus the embodiment shown in FIG. 1 is for conceptual clarity only and not by way of limitation of the embodiments of the present invention.

Network switch 24 shown in FIG. 1 with switch fabric 40 and switch control unit 44 may be fabricated entirely on a single Application Specific Integrated Circuit (ASIC) die, or separately as stand-alone dies, packaged devices, or using any other suitable hardware implementation. Alternatively, network switch 24 may comprise a microprocessor that implements the any of the functions of switch fabric 40 and switch control unit 44 by running any suitable software, or a combination of hardware and software elements.

In some embodiments, certain functions of control unit 44 may be implemented using a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The description that follows refers to techniques for processing synchronization packets. Although the embodiments described herein refer to these techniques as being carried out by control unit 44, the disclosed techniques can be implemented using any other suitable circuitry. For example, some or all functions of control unit 44 may be carried out by circuitry that is directly coupled to ports 50. Thus, in the present context, the disclosed techniques may be carried out by any suitable control circuitry in switch 24.

Direct Updating of Network Switch Delay in Synchronization Packet

In some embodiments, system 20 synchronizes the various nodes 32 to the time base of clock master 36, for example using the IEEE 1588-2008 protocol cited above. In a network operating with this protocol, a local (slave) clock is typically generated at each node 32 in order to properly receive the information data packets.

Network 22 uses clock master 36 to transmit synchronization data packets whose payload, at any given time, comprises the overall network delay that the packet accumulated. This accumulated network delay is used by the node to synchronize its local (slave) clock to the clock of clock master 36.

As the synchronization data packet traverses different network elements, such as a network switches, routers, bridges, and gateways, the element delay (ED) that the packet experiences through the network element needs to be added to the accumulated network delay (ND).

Typically, each network element is configured to time stamp the arrival times (T1) and departure times (T2) of the synchronization data packets traversing the network element, and to add the difference between the time stamps, e.g., network element delay (ED=T2−T1), to the accumulated network delay ND in the appropriate packet delay field in the packet payload.

It is possible in principle for the network element to store the packet arrival time in memory, and use the stored value to update the delay field before the packet leaves the switch. This solution, however, requires the network element to comprise expensive storage elements to be able to process the complex time stamp handling. The embodiments presented herein eliminate the need for time stamp handling of this sort, by performing all delay-related storage in the delay field of the synchronization packet itself.

Figure 2:
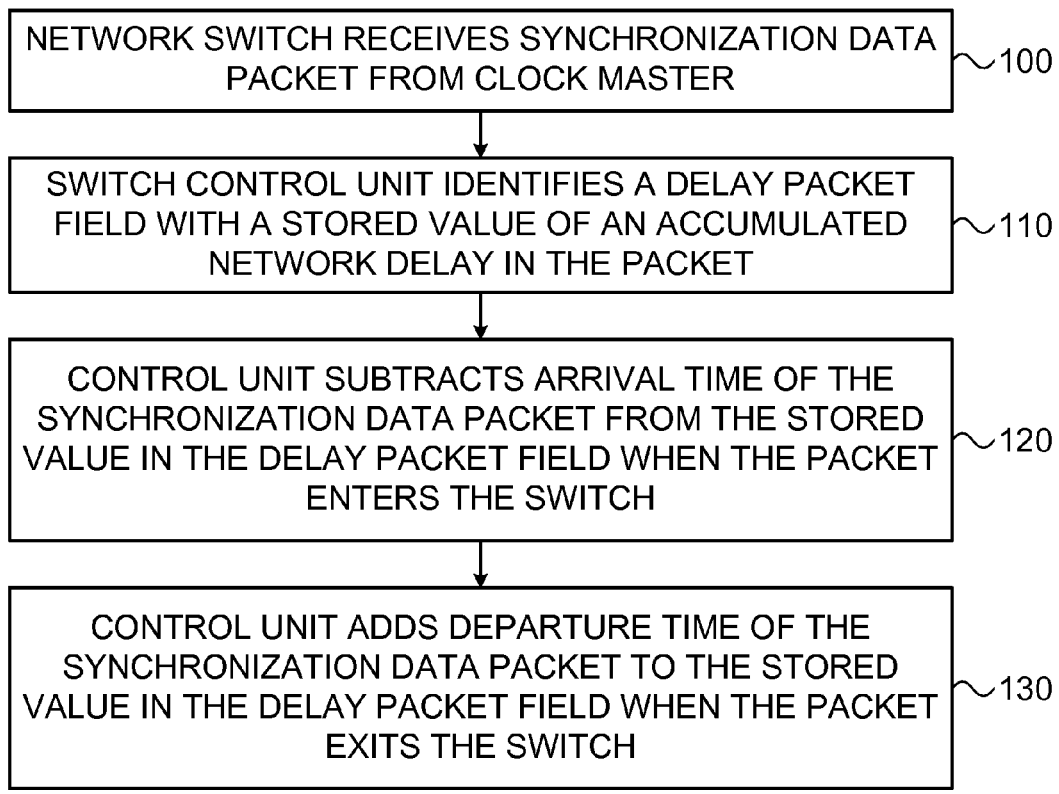
FIG. 2 is a flow chart that schematically illustrates a method for directly updating a network switch delay in a synchronization data packet, in accordance with an embodiment of the present invention.

FIG. 2 is a flow chart that schematically illustrates a method for directly updating a network switch delay in a synchronization data packet, in accordance with an embodiment of the present invention. In a receive step 100, network switch 24 receives a synchronization data packet over network 22 from clock master 36. The synchronization data packet typically comprises one or fields related to timing and synchronization parameters in accordance with the chosen network protocol, such as IEEE 1588-2008, for example. in an example embodiment, the synchronization packet comprises a time field containing the time of departure from the clock master, and a delay field containing the accumulated network delay.

In an identifying step 110, switch control unit 44 identifies the delay field containing the stored value of the accumulated network delay (ND). In a subtracting step 120, when the packet enters switch 24 at the designated ingress port, switch control unit 44 subtracts the arrival time (T1) of the synchronization data packet from the stored value (ND) to produce an interim value (ND−T1). Unit 44 stores the interim value (ND−T1) directly in the delay field of the packet, overwriting the previously stored value of ND. The packet is then forwarded to the egress port by fabric 40.

In an adding step 130, just before the packet exits the switch, switch control unit 44 adds the departure time (T2) to the interim value stored in the delay field, to produce (ND−T1+T2). The value stored in the delay field when the synchronization packet leaves the switch is $ND_{new}=ND+(T2-T1)=ND+ED$.

Thus, the network element (switch) delay ED is added to the accumulated network delay ND, and the new accumulated network delay $ND_{new}$ is directly updated in the delay field without the use of complex time stamp handling techniques as previously described.

In some embodiments, the delay field updating operations are performed locally at the ingress and egress ports. In these embodiments, circuitry coupled to the ingress port extract ND from the delay field, subtract the arrival time T1 from ND to produce the interim value ND−T1, and substitute the interim value back in the delay field of the packet. Circuitry coupled to the egress port extracts ND−T1 from the delay field when the packet is about to leave the switch, calculates $ND_{new}=ND+(T2-T1)$ using the departure time T2, and substitute $ND_{new}$ in the delay field of the packet.

Although the embodiments described herein mainly address network switches, the methods described herein can also be used for other suitable network elements.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising: receiving in a network element a packet, which comprises a delay field that indicates an overall time delay accumulated by the packet until arriving at the network element; upon receiving the packet, substituting in the delay field an interim value, which is indicative of a difference between the overall time delay and an arrival time of the packet at the network element; before sending the packet from the network element, updating the overall time delay in the delay field based on the interim value and on a departure time at which the packet is to exit the network element; and transmitting the packet, comprising the updated overall time delay, from the network element; wherein substitution of the interim value is performed at an ingress port at which the packet enters the network element, and wherein updating of the overall time delay is performed at an egress port at which the packet exits the network element.

2. The method according to claim 1, wherein updating the overall time delay comprises adding a departure time at which the packet is to exit the network element to the interim value.

3. The method according to claim 1, wherein updating the overall time delay is performed without buffering any indication of the arrival time outside the packet.

4. The method according to claim 1, wherein the packet comprises a synchronization packet used for synchronizing network nodes to a common time base.

5. The method according to claim 4, wherein the synchronization packet complies with an IEEE 1588-2008 protocol.

6. A network element, comprising: multiple ports; a fabric, which is configured to forward packets between the ports; and control circuitry, which is configured to receive over one of the ports a packet comprising a delay field that indicates an overall time delay accumulated by the packet until arriving at the network element, to substitute in the delay field, upon receiving the packet, an interim value that is indicative of a difference between the overall time delay and an arrival time of the packet at the network element, to update the overall time delay in the delay field, before sending the packet from the network element, based on the interim value and on a departure time at which the packet is to exit the network element, and to transmit the packet, comprising the updated overall time delay, from the network element over another of the ports; wherein the control circuitry is configured to substitute the interim value at an ingress port at which the packet enters the network element, and to update the overall time delay at an egress port at which the packet exits the network element.

7. The network element according to claim 6, wherein the control circuitry is configured to update the overall time delay by adding a departure time at which the packet is to exit the network element to the interim value.

8. The network element according to claim 6, wherein the control circuitry is configured to update the overall time delay without buffering any indication of the arrival time outside the packet.

9. The network element according to claim 6, wherein the packet comprises a synchronization packet used for synchronizing network nodes to a common time base.

10. The network element according to claim 9, wherein the synchronization packet complies with an IEEE 1588-2008 protocol.

11. The method according to claim 1, wherein updating the overall time delay comprises adding a delay of the packet through the network element to the overall time delay.

12. The network element according to claim 6, wherein the control circuitry is configured to update the overall time delay by adding a delay of the packet through the network element to the overall time delay.

* * * * *